United States Patent [19]

Sartori et al.

[11] 4,101,633

[45] Jul. 18, 1978

[54] PROCESS AND COMPOSITION FOR REMOVING CARBON DIOXIDE CONTAINING ACIDIC GASES FROM GASEOUS MIXTURES

[75] Inventors: Guido Sartori, Linden; David W. Savage, Summit, both of N.J.

[73] Assignee: Exxon Research & Engineering Co., Linden, N.J.

[21] Appl. No.: 768,421

[22] Filed: Feb. 14, 1977

[51] Int. Cl.² ............................................. B01D 53/34
[52] U.S. Cl. .................................... 423/228; 423/229
[58] Field of Search ....................... 423/220, 228, 229; 260/584 R

[56] References Cited

U.S. PATENT DOCUMENTS

| | | | |
|---|---|---|---|
| 2,139,122 | 12/1938 | Hass et al. | 260/584 R |
| 2,139,124 | 12/1938 | Hass et al. | 260/584 R |
| 3,622,267 | 11/1971 | Bartholome et al. | 423/229 |
| 4,025,322 | 5/1977 | Fisch | 423/228 X |

*Primary Examiner*—Earl C. Thomas
*Attorney, Agent, or Firm*—Albert P. Halluin

[57] ABSTRACT

Carbon dioxide containing acidic gases are substantially removed from a normally gaseous mixture by a process comprising contacting the normally gaseous mixture with an aqueous amine solution, wherein the amine consists of at least about 50 mol % of a sterically hindered amino alcohol and at least about 10 mol % of a tertiary amino alcohol, wherein said sterically hindered amino alcohol contains at least one secondary amino group which is part of a ring and is attached to either a secondary or tertiary carbon atom or a primary amino group attached to a tertiary carbon atom. The coaction of the sterically hindered amino alcohol and the tertiary amino alcohol provide an increase in the amount of carbon dioxide containing acidic gases absorbed compared to the use of the sterically hindered amines alone and lowers the heat of reaction.

16 Claims, No Drawings

PROCESS AND COMPOSITION FOR REMOVING CARBON DIOXIDE CONTAINING ACIDIC GASES FROM GASEOUS MIXTURES

BACKGROUND OF THE INVENTION

1. Field of the Invention

This invention relates to an improved process for removing carbon dioxide containing acidic gases from normally gaseous mixtures containing them and more particularly relates to a process of accomplishing substantial removal of carbon dioxide containing acidic gases from normally gaseous mixtures by contacting the normally gaseous mixtures with a concentrated solution containing a sterically hindered amine and a tertiary amine.

2. Description of the Prior Art

It is well known in the art to treat gases and liquids, such as mixtures containing acidic gases including $CO_2$, $H_2S$, $SO_2$, $SO_3$, $CS_2$, HCN, COS and oxygen and sulfur derivatives of $C_1$ to $C_4$ hydrocarbons with amine solutions to remove these acidic gases. The amine usually contacts the acidic gases and the liquids as an aqueous solution containing the amine in an absorber tower with the aqueous amine solution contacting the acidic fluid countercurrently.

The acid scrubbing processes known in the art can be generally broken into three categories.

The first category is generally referred to as the aqueous amine process where relatively concentrated amine solutions are employed during the absorption. This type of process is often utilized in the manufacture of ammonia where nearly complete removal of the acid gas, such as $CO_2$, is required. It is also used in those instances where an acid gas, such as $CO_2$, occurs with other acid gases or where the partial pressures of the $CO_2$ and other gases are low. Aqueous monoethanolamine (MEA) is widely used in this type of process since it provides a high degree of $CO_2$ removal. One of its drawbacks is the high stability of its carbamate which causes its regeneration to be slow and incomplete.

A second category is generally referred to as the aqueous base scrubbing process or "hot pot" process. In this type of process a small level of an amine is included as an activator for the aqueous base used in the scrubbing solution. This type of process is generally used where bulk removal of an acid gas, such as $CO_2$, is required. This process also applies to situations where the $CO_2$ and feed gas pressures are high. In such processes, useful results are achieved using aqueous potassium carbonate solutions and an amine activator.

A third category is generally referred to as the nonaqueous solvent process. In this process, water is a minor constituent of the scrubbing solution and the amine is dissolved in the liquid phase containing the solvent. In this process, up to 50% of the amine is dissolved in the liquid phase. This type of process is utilized for specialized applications where the partial pressure of $CO_2$ is extremely high and/or where many acid gases are present, e.g., COS, $CH_3SH$ and $CS_2$.

The present invention pertains to an improved process for practicing the first category of acid scrubbing processes described above, namely, the aqueous amine process where relatively concentrated amine solutions are employed during the absorption. Many industrial processes for removal of carbon dioxide containing acidic gases use regenerable aqueous solutions of amines which are continuously circulated between an absorption zone where the acidic gases including the carbon dioxide are absorbed and a regeneration zone where the aqueous amine containing absorption solution which is saturated with the acidic components is desorbed usually by steam stripping. The capital cost of these acid scrubbing processes is generally controlled by the size of the absorption and regeneration towers, the size of the reboilers for generating stripping steam, and the size of the condensers which condense spent stripping steam so that condensate may be returned to the system to maintain proper water balance.

The cost of operating such scrubbing plants is generally related to the amount of heat required for the removal of a given amount of acid gas, e.g., thermal efficiency, sometimes expressed as cubic feet of acid gas removed per pound of steam consumed. Means for reducing the costs in operating these industrial processes have focused on the use of absorbing systems or combinations of chemical absorbents which will operate more efficiently and effectively in acid gas scrubbing processes using existing equipment.

There are a number of patents which describe improvements to improve the efficiency of the above-described processes for removing acidic gases from gaseous mixtures. Some of these improvments are described below.

Canadian Pat. No. 619,193 teaches the use of various aqueous solutions containing salts of aminoacids for removing carbon dioxide containing gases from gaseous mixtures. This patent is concerned with the same type of acid gas scrubbing process as provided by the instant invention. However, this Canadian patent does not disclose the use of aqueous solutions containing amines wherein the amino group is sterically hindered, and particularly the amino alcohols.

Prior art workers have taught that sterically hindered amines would have low rates of combination with $CO_2$ and apparently concluded, although other explanations are possible, that such sterically hindered amines would be inefficient in $CO_2$ scrubbing processes. For example, Sharma, M. M., Trans. Faraday Soc., 61, 681–8 (1965) described the kinetics of reaction between $CO_2$ and COS with 38 amines, some of which are sterically hindered amines. Other researchers have attributed relatively poor absorption rates of $CO_2$ by amines to steric hindrance. See, for example, J. L. Frahn and J. A. Mills, Aust. J. Chem., 17, 256–73, 263 (1964) and M. B. Jensen, Acta Chemica Scandinavica, 11, 499–505 (1957).

Shrier and Danckwerts, Ind. Eng. Chem. Fundamentals, 8, 415 (1969) discussed the use of amines as promoters for aqueous carbon dioxide absorption solutions. However, these researchers only ran initial absorption rate experiments and did not recognize the unique capacity advantages obtained by using sterically hindered amines in an acid gas scrubbing process. Also of interest is Danckwerts and Sharma, The Chemical Engineer, Oct. 1966, pp 244–280.

U.S. Pat. No. 2,176,441 to Ulrich et. al. teaches the use of aminoacids having a primary, secondary of tertiary amino group and at least two nitrogen atoms to remove acidic gases. The patentees provide various general formulae for the aminoacids taught to be useful in the acid gas scrubbing process. While certain "sterically hindered amines" can be derived by proper choice of substituent groups in the general formulae there is no teaching that these amines will achieve any unexpected results, such as improved regeneration rates coupled with high rates of absorption.

There are a number of patents which disclose the use of various amines as "activators" in an alkaline scrubbing solution wherein the primary absorbent is an alkaline salt such as potassium carbonate. Some of these processes are described in U.S. Pat. Nos. 2,718,454, 3,144,301, 3,637,345, 3,793,434, 3,848,057, 3,856,921, 3,563,695, 3,563,696 and 3,642,430, as well as some other patents such as Belgian Pat. No. 767,105; British Pat. Nos. 1,063,517, 1,218,083, and 1,305,718. British Pat. No. 1,238,696 describes a process whereby acid gases are removed from gaseous streams by use of alkanol amines and an organic solvent.

U.S. Pat. No. 3,856,921 is of interest since it discloses and claims the use of 2-methyl-aminoethanol, 2-ethylaminoethanol, morpholine, pyrrolidine and derivatives thereof as activators for the basic salt of an alkali or alkaline earth metal. However, this patent does not teach the use of sterically hindered amines and/or their use in an aqueous amine acid gas scrubbing process as instantly claimed.

In the prior art processes discussed above, it is apparent that the efficiency of processes employing absorbing solutions is generally limited by the relatively slow rate of transfer of molecules of the acid gas from the gas phase to the liquid phase as well as in the regeneration of the absorbing solution. Many of the above-described prior art processes deal with means to render the acid gas scrubbing process more efficient.

In copending U.S. application Ser. No. 590,427, filed June 26, 1975, the disclosure of which is incorporated herein by reference, there is disclosed and claimed sterically hindered amine compositions useful for scrubbing acid gases. These sterically hindered amines, unexpectedly improve the efficiency, effectiveness and working capacity of the acid gas scrubbing processes in all three of the abovementioned process categories. It was postulated in U.S. Ser. No. 590,427 that the increase in cyclic capacity observed with the sterically hindered amines is due to the instability of their carbamates. In that respect, sterically hindered amines are similar to tertiary amines. Tertiary amines are not used on a commercial scale for carbon dioxide containing acid gas scrubbing due to their low rates of absorption and desorption.

It has been observed that some of the preferred sterically hindered amines for the aqueous amine process, i.e., the sterically hindered amino alcohols cannot be used in high concentrations without running the risk of precipitation when the aqueous solution is saturated with carbon dioxide. This is an economical disadvantage because conventional amines used in the aqueous amine scrubbing process, i.e, monoethanolamine (MEA) and diethanolamine (DEA) can be used in concentrations up to 5 M.

It has now been unexpectedly discovered that aqueous solutions containing the sterically-hindered amino alcohols in combination with tertiary amino alcohols are capable of achieving higher total amine concentrations than the sterically hindered amino alcohols alone. As a consequence of this unexpected discovery, more carbon dioxide containing acid gas can be treated per unit of volume of solution than with the solutions containing the sterically hindered amino alcohols alone, yet the advantages of improved cyclic capacity are still enjoyed.

It has also been discovered that the combination of tertiary amino alcohol and the sterically hindered amino alcohol provides a lower heat of reaction than the aqueous solutions containing the sterically hindered amino alcohols alone, and in some instances a lower heat of reaction than with diethanolamine can be accomplished.

SUMMARY OF THE INVENTION

In one embodiment of the present invention there is provided a process for the substantial removal of carbon dioxide containing gases from a normally gaseous mixture, which comprises:

(a) contacting said normally gaseous mixture with an aqueous amine solution comprising at least about 50 mol % of a sterically hindered amino alcohol and at least about 10 mol % of a tertiary amino alcohol, wherein said sterically hindered amino alcohol contains at least one secondary amino group which is part of a ring and is attached to either a secondary or tertiary carbon atom or a primary amino group attached to a tertiary carbon atom; and (b) desorbing at least a portion of the absorbed carbon dioxide containing acidic gases from said solution.

In another embodiment of the present invention there is provided an aqueous amine solution wherein the amine is comprised of:

(a) at least about 50 mol % of a sterically hindered amino alcohol, wherein the sterically hindered amino alcohol contains at least one secondary amino group which is part of a ring and is attached to either a secondary or tertiary carbon atom or a primary amino group attached to a tertiary carbon atom, and (b) at least about 10 mol % of a tertiary amino alcohol.

Preferably, the total amine concentration in the aqueous solution will be in the range from about 1 to about 6 molar, and more preferably from about 3 to about 5 molar. The most preferred concentrated solutions will contain at least about 65 mol % of the sterically hindered amino alcohol and 20 to about 35 mol % of the tertiary amino alcohol.

DESCRIPTION OF THE PREFERRED EMBODIMENTS

The term carbon dioxide containing acidic gas also includes $H_2S$, $SO_2$, $SO_3$, $CS_2$, HCN, COS and the oxygen and sulfur derivatives of $C_1$ to $C_4$ hydrocarbons in various amounts as they frequently appear in gaseous mixtures. These acid gases other than the carbon dioxide may be present in trace amounts within a gaseous mixture or in major proportions.

The contacting of the absorbent amine mixture and the carbon dioxide containing acidic gas may take place in any suitable contacting tower. In such processes, the normally gaseous mixture from which the acid gases are to be removed may be brought into intimate contact with the absorbing solution using conventional means, such as a tower packed with, for example, ceramic rings or saddles or with bubble cap plates or sieve plates, or a bubble reactor.

In a preferred mode of practicing the invention, the absorption step is conducted by feeding the gaseous mixture into the base of the tower while fresh and/or regenerated absorbing solution is fed into the top. The gaseous mixture freed largely from acid gases emerges from the top. Preferably, the temperature of the absorbing soluting during the absorption step is in the range from about 20° to about 100° C, and more preferably from 40° to about 60° C. Pressures may vary widely; acceptable pressures are between 5 and 2000 psig, preferably 100 to 1500 psig, and most preferably 200 to 1000 psig in the absorber. The contacting takes place under conditions such that the acid gas, e.g., $CO_2$, is absorbed by the solution. During absorption, the solution is maintained in a single phase.

The absorbing solution comprising the aqueous mixture containing the water soluble amine absorbent mixture which is saturated or partially saturated with gases, such as $CO_2$ and $H_2S$ may be regenerated so that it may be recycled back to the absorber. The regeneration should also take place in a single liquid phase. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower. The temperature of the solution during the regeneration step should be in the range from about 50° to about 170° C, and preferably 80° to 150° C. The absorbing solution, after being cleansed of at least a portion of the acid bodies, may be recycled back to the absorbing tower. Makeup absorbent may be added as needed.

For example, during desorption, $CO_2$-rich solution from the high pressure absorber is sent first to a flash chamber where steam and some $CO_2$ are flashed from the solution at low pressure. The amount of $CO_2$ flashed off will in general be about 35 to 40% of the net $CO_2$ recovered in the flash and stripper. This is increased somewhat, e.g., to 40 to 50%, with the sterically hindered/tertiary amine blend owing to a closer approach to equilibrium in the flash. Solution from the flash drum is then steam stripped in the packed or plate tower, stripping steam having been generated in the reboiler in the base of the stripper. Pressure in the flash drum and stripper is usually 1 to about 50 psia, preferably 15 to about 30 psia, and the temperature is in the range from about 50° to about 170° C, preferably 80° to about 150° C. Stripper and flash temperatures will, of course, depend on stripper pressure, thus at about 15 to 30 psia stripper pressures, the temperature will be about 80° to about 150° C during desorption.

In the most preferred embodiment of the present invention, substantially complete removal of carbon dioxide containing acidic gases from normally gaseous mixtures is accomplished by a process comprising:

(a) contacting said normally gaseous mixture with an aqueous concentrated water soluble amine solution wherein the water soluble amine consists essentially of at least about 50 mol %, preferably at least about 65 mol %, of a sterically hindered amino alcohol and at least about 10 mol %, and preferably 20 to about 35 mol % of a tertiary amino alcohol, wherein said sterically hindered amino alcohol contains at least one secondary amino group which is part of a ring and is attached to either a secondary or tertiary carbon atom or a primary amino group attached to a tertiary carbon atom, wherein the total amine concentration in said solution is in the range from about 1 to about 6 molar, preferably 3 to about 5 molar, said contacting being conducted at conditions whereby the carbon dioxide containing acidic gas is absorbed in said amine solution, and preferably at a temperature ranging from about 20° to about 100° C, more preferably from about 40° to about 60° C, and at a pressure ranging from about 5 to about 2000 psig, preferably 100 to about 1500 psig, and most preferably 200 to about 1000 psig, and (b) regenerating the amine solution by a desorption step at conditions whereby at least a portion of said carbon dioxide containing gases is desorbed from the amine solution, preferably at a temperature in the range from about 50° to about 170° C, and more preferably from 80° to about 150° C and at a pressure ranging from about 1 to about 50 psia and more preferably from about 15 to 30 psia. The regenerated amine solution may thereafter be recycled to the absorber as is or it may be combined with fresh makeup scrubbing solution.

It is possible, of course, to employ the process of the present invention in conjunction with other acid gas scrubbing processes. For example, gases rich in carbon dioxide may be first scrubbed by a bulk scrubbing process using the "hot pot" process, preferably the processes disclosed in U.S. Ser. No. 590,427 and U.S. Ser. No. 750,520, filed Dec. 14, 1976, (Case No. C-517) entitled "Process for Removing Acid Gases with Hindered Amines and Aminoacids," the disclosures of which are incorporated herein by reference. This coarsely prepurified gas may then be treated in accordance with the teachings of the present invention to remove the last residues of the carbon dioxide containing gases.

THE STERICALLY HINDERED AMINO ALCOHOLS

As stated earlier, the sterically hindered amino alcohols useful in the practice of the present invention include those amino alcohols which contain at least one secondary amino group which is part of a ring and is attached to either a secondary or tertiary carbon atom or a primary amino group attached to a tertiary carbon atom. The most preferred sterically hindered amino alcohols useful in the practice of the present invention include 2-amino-2-methyl-1-propanol, 2-amino-2-methyl-1-butanol, 3-amino-3-methyl-1-butanol and 3-amino-3-methyl-2-pentanol.

Nonlimiting examples of the sterically hindered amino alcohols useful in the practice of the present invention include:

AMINOETHERS sterically hindered amino-hydroxyalkyl ethers:

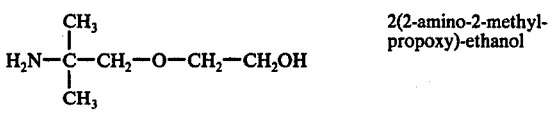

2(2-amino-2-methyl-propoxy)-ethanol

AMINOALCOHOLS sterically hindered primary monoaminoalcohols:

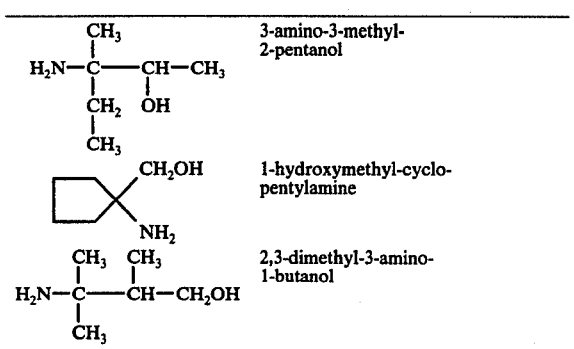

3-amino-3-methyl-2-pentanol 1-hydroxymethyl-cyclopentylamine 2,3-dimethyl-3-amino-1-butanol

| Structure | Name |
|---|---|
| H₂N—C(CH₂CH₃)(CH₂CH₃)—CH₂OH | 2-amino-2-ethyl-1-butanol |
| (1-methyl-2-hydroxy cyclobutyl with OH, NH₂, CH₃) | 1-methyl-2-hydroxy-cyclopentylamine |
| H₂N—C(CH₃)(CH₃)—CH(OH)—CH₂—CH₃ | 2-amino-2-methyl-3-pentanol |
| (cyclohexane with CH₃, CH₃, NH₂, OH) | 2,4-dimethyl-2-amino cyclohexanol |
| (cyclohexane with NH₂, CH₂—CH₂—OH) | 1-hydroxyethyl cyclohexylamine |
| (cyclohexane with CH₂OH, NH₂, CH₃) | 1-hydroxymethyl-3-methyl cyclohexylamine |
| (cyclohexane with CH₂OH, NH₂, CH₃) | 2-hydroxymethyl-1-methyl cyclohexylamine |
| H₂N—C(CH₃)(CH₃)—CH₂OH | 2-amino-2-methyl-1-propanol |
| H₂N—C(CH₃)(CH₂CH₃)—CH₂OH | 2-amino-2-methyl-1-butanol |
| H₂N—C(CH₃)(CH₃)—CH₂—CH₂OH | 3-amino-3-methyl-1-butanol |
| H₂N—C(CH₃)(CH₃)—CH(OH)—CH₃ | 3-amino-3-methyl-2-butanol |
| H₂N—C(CH₃)(CH₃)—C(CH₃)(CH₃)—OH | 2-amino-2,3-dimethyl-3-butanol |
| H₂N—C(CH₃)(CH₂OH)—CH(CH₃)(CH₃) | 2-amino-2,3-dimethyl-1-butanol |
| (cyclohexane with CH₂OH, NH₂) | 1-hydroxymethyl-cyclohexylamine |

2-substituted piperdine alcohols

| Structure | Name |
|---|---|
| (piperidine with CH₂OH at 2-position) | 2-piperidine methanol |
| (piperidine with CH₂—CH₂OH at 2-position) | 2-piperidine ethanol |
| (piperidine with CH(OH)—CH₃ at 2-position) | 2-(1-hydroxyethyl)-piperidine |
| (piperidine with OH at 5, CH₃ at 2) | 5-hydroxy-2-methyl piperidine |
| (piperidine with OH at 3, CH₃ at 2) | 2-methyl-3-hydroxy piperidine |
| (piperidine with OH at 3, CH₃ at 2 and 6) | 2,6-dimethyl-3-hydroxy piperidine |
| (piperidine with OH at 4, CH₃ at 2 and 5) | 2,5-dimethyl-4-hydroxy piperidine |

THE TERTIARY AMINO ALCOHOLS

The tertiary amino alcohols to be used in combination with the sterically hindered amino alcohols include those tertiary amino alcohols which are water-soluble and increase the solubility of the sterically hindered amino alcohols at high levels of $CO_2$ concentration. The preferred tertiary amino alcohols include N-methyl-diethanolamine, 2-dimethylamino ethanol, 3-dimethylamino-1-propanol and 1-diethylamino-2-propanol.

Nonlimiting examples of tertiary amino alcohols that can be used in accordance with the practice of the present invention include:

| Structure | Name |
|---|---|
| CH₃—N(CH₂—CH₂OH)(CH₂—CH₂OH) | N-methyl diethanolamine |
| C₂H₅—N(CH₂—CH₂OH)(CH₂—CH₂OH) | N-ethyl diethanolamine |
| (CH₃)(CH₃)N—CH₂—CH₂OH | 2-dimethylamino ethanol |

-continued

| Structure | Name |
|---|---|
| (CH₃)(CH₃)N—CH(CH₃)—CH₂OH | 2-dimethylamino-1-propanol |
| (CH₃)(CH₃)N—CH₂—CH₂—CH₂OH | 3-dimethylamino-1-propanol |
| (CH₃)(CH₃)N—CH₂—CH(OH)—CH₃ | 1-dimethylamino-2-propanol |
| (CH₃)(C₂H₅)N—CH₂—CH₂OH | N-methyl-N-ethyl ethanolamine |
| (C₂H₅)(C₂H₅)N—CH₂—CH₂OH | 2-diethylamino-ethanol |
| (CH₃)(CH₃)N—CH(CH₃)—CH₂—CH₂OH | 3-dimethylamino-1-butanol |
| (CH₃)(CH₃)N—CH(CH₃)—CH(OH)—CH₃ | 3-dimethylamino-2-butanol |
| (CH₃)(CH(CH₃)₂)N—CH₂—CH₂OH | N-methyl-N-isopropyl-ethanolamine |
| (CH₃)(C₂H₅)N—CH₂—CH₂—CH₂OH | N-methyl-N-ethyl-3-amino-1-propanol |
| (CH₃)(CH₃)N—CH₂—CH₂—CH₂—CH₂OH | 4-dimethylamino-1-butanol |
| (CH₃)(CH₃)N—CH₂—CH₂—CH(OH)—CH₃ | 4-dimethylamino-2-butanol |
| (CH₃)(CH₃)N—CH₂—CH(CH₃)—CH₂OH | 3-dimethylamino-2-methyl-1-propanol |
| (CH₃)(CH₃)N—CH₂—C(CH₃)(OH)—CH₃ | 1-dimethylamino-2-methyl-2-propanol |
| CH₃—CH₂—CH(N(CH₃)₂)—CH₂OH | 2-dimethylamino-1-butanol |
| CH₃—C(CH₂OH)(CH₃)—N(CH₃)(CH₃) | 2-dimethylamino-2-methyl-1-propanol |

The tertiary amino alcohol may be used with the sterically hindered amino alcohol in any convenient manner. In one preferred embodiment of the invention the sterically hindered amino alcohol and the tertiary amino alcohol are premixed and placed in the form of a concentrate. This concentrate may optionally include commonly used additives, such as antifoaming agents, antioxidants, corrosion inhibitors, etc. Examples of such additives include arsenious anhydride, selenious and tellurous acid, protides, vanadium oxides, e.g., $V_2O_3$, chromates, e.g., $K_2Cr_2O_7$, etc.

The invention is illustrated further by the following examples which, however, are not to be taken as limiting in any respect. All parts and percentages, unless expressly stated to be otherwise, are by weight.

EXAMPLE 1

To a 1-liter autoclave equipped with a stirrer, inlet and outlet tubes for gases (the entering gases are saturated with water and the outgoing gases pass through a condenser so as to keep constant the amount of water present in the autoclave and liquid sampling device) there is charged an aqueous amine scrubbing solution consisting of 500 g of about 3 M 2-amino-2-methyl-1-propanol (AMP) alone or in combination with the tertiary amino alcohols. Equilibrium experiments are carried out, where absorption conditions are simulated at 100° F (37.7° C) and at $P_{CO_2}$ of 40 psia. Desorption conditions are simulated at 250° F (121.1° C) and at $P_{CO_2}$ of 0.04 psia. Table I gives the amounts of $CO_2$ absorbed by 500 g of various amine scrubbing solutions. Desorption was virtually complete in all cases.

TABLE I

Results of Equilibrium Experiments

| Sterically-Hindered Amino Alcohol | Tertiary Amino Alcohol | g $CO_2$ Absorbed |
|---|---|---|
| 3 M 2-amino-2-methyl-1-propanol | none | 62.5 |
| " | 1.5 M N-methyl diethanolamine | 89 |
| " | 1.5 M 2-dimethylamino ethanol | 83 |
| " | 1.5 M 3-dimethylamino-1-propanol | 93 |
| " | 2 M 1-diethylamino-2-propanol | 97 |

Table I clearly shows that addition of the tertiary amino alcohol in accordance with the practice of the present invention leads to a larger capacity than obtainable with 3 M sterically hindered amino alcohol, 2-amino-2-methyl-1-propanol alone. Under the same conditions, 500 g of 5 M diethanolamine absorb 70 g of $CO_2$, i.e. less than observed with sterically hindered and tertiary amines.

From the equilibrium isotherms it is possible to calculate the heats of reaction for various $CO_2$/amine molar ratios. Their averages for various solutions are compared in Table II. It is clear that the addition of the tertiary amino alcohol leads to a lower heat of reaction than that of 2-amino-2-methyl-1-propanol alone.

TABLE II

Heats of Absorption of $CO_2$

| Sterically-Hindered Amino Alcohol | Tertiary Amino Alcohol | ΔH, BTU /lb mol |
|---|---|---|
| 3 M 2-amino-2-methyl 1-propanol | None | 31,500 |
| " | 1.5 M N-methyl diethanolamine | 24,000 |
| " | 1.5 M 2-dimethylamino ethanol | 24,000 |
| " | 1.5 M 3-dimethylamino-1-propanol | 22,000 |
| " | 2 M 1-dimethylamino-2-propanol | 25,500 |

EXAMPLE 2

The gas-liquid equilibrium experiments of Example 1 are repeated using 1 kg of 3 M 2-amino-2-methyl-1-propanol (AMP), alone or in combination with 1.5 M N-methyl diethanolamine (MDEA) as the amine scrubbing solution. The results of these experiments are set forth in Table III.

TABLE III

Amounts of $CO_2$ Present in 1 Kg of (Initial) Solution under Absorption and Desorption Conditions

|  | 3M AMP | 3M AMP + 1.5M MDEA |
|---|---|---|
| 100° F, $PCO_2$ = 40 psi | 130 g $CO_2$ | 178 g $CO_2$ |
| 250° F, $PCO_2$ = .1 psi | 3 g $CO_2$ | 2 g $CO_2$ |
| Difference | 127 g $CO_2$ | 176 g $CO_2$ |

It is clear from Table III that the addition of MDEA leads to a 40% increase in the amount of $CO_2$ handled in an absorption-desorption cycle, e.g., 176 g $CO_2$ vs. 127 g $CO_2$.

The heat of absorption of $CO_2$ into 3 M 2-amino-2-methyl-1-propanol (AMP), alone or in combination with the tertiary amino alcohol, N-methyl diethanolamine (MDEA), is calculated from the isotherms at various $CO_2$/amine ratios. These data are set forth in Table IV. It is clear that the addition of MDEA leads to a definite decrease in the heat of reaction (absorption) especially in the rich region. For example, it can be seen that for values of the $CO_2$/amine ratio above 0.6, the heat of absorption for 3 M AMP + 1.5 M MDEA is similar to that observed for aqueous $K_2CO_3$ systems containing amine promoters.

TABLE IV

Heats of Reaction of $CO_2$ with AMP or AMP + MDEA at Various $CO_2$/Amine Ratios[a]

| Amine | $CO_2$/Amine .2 | $CO_2$/Amine .4 | $CO_2$/Amine .6 |
|---|---|---|---|
| 3M AMP | 36,000 BTU/lb mol | 32,400 BTU/lb mol | 30,200 BTU/lb mol |
| 3M AMP + 1.5M MDEA | 31,700 BTU/lb mol | 25,000 BTU/lb mol | 20,800 BTU/lb mol |

[a]$CO_2$/Amine Ratios are expressed in molar amounts.

By the coaction of the tertiary amino alcohols and the sterically hindered amino alcohols it has been unexpectedly discovered, as shown by the above examples, that a higher total amine concentration can be used than with the sterically hindered amino alcohol alone and, as a consequence, more $CO_2$ can be treated per unit volume of solution. The amine scrubbing solution of the present invention also unexpectedly gives a lower heat of reaction than the sterically hindered amino alcohols (e.g., as shown in Table IV). Experiments and calculations have also shown that the heat of absorption of the 3 M AMP/2 M 1-diethylamino-2-propanol (DEAP) solution is 27,000 BTU/lb mol whereas the average value given in the literature for diethanolamine (DEA) is 28,700 BTU/lb mol.

EXAMPLE 3

$CO_2$ absorption-desorption cycles are carried out in a glass apparatus at atmospheric pressure. The absorber is similar to that described in copending U.S. application Ser. No. 590,427, filed June 26, 1975, i.e. a vessel having a capacity of 2.5 liters and a diameter of 10 cm, equipped with a heating jacket, a stirrer, a reflux condenser and an inlet tube for gases.

The desorber is a 1-liter vessel, equipped with a teflon blade stirrer, gas sparger, reflux condenser and thermometer.

Solutions of various amines are subjected to absorption-desorption-reabsorption cycles. Each solution is first put into the absorber and brought to 40° C.

The absorber is evacuated until the solution begins to boil, then $CO_2$ is admitted until the solution is saturated. The rich solution is transferred to the desorber and boiled for 15 minutes while slowly blowing nitrogen, which causes evolution of $CO_2$. The thus regenerated solution is transferred back to the absorber and contacted again with $CO_2$. Table V gives the liters of $CO_2$ reabsorbed by the various solutions. Also, in order to compare rates of reabsorption, the times needed by the various solutions to absorb the sixth through the tenth and the sixteenth through the twentieth liter of $CO_2$ are also given. Based on these experiments and the data obtained therefrom, the following observations can be made:

(a) a tertiary amine alone (Experiment 9) leads to much lower rates than a conventional or a sterically-hindered amine of equivalent concentration (Experiments 1 and 2), although it absorbs more $CO_2$ than the conventional amine does and only slightly less than a sterically-hindered amine does;

(b) addition of a tertiary amine to a sterically-hindered amine (Experiments 4–7) leads to a certain increase in amount of $CO_2$ reabsorbed as compared to the sterically-hindered amine alone (Experiment 1); and (c) the same combinations of tertiary and sterically-hindered amines (Experiments 4 and 5) lead to similar rates as those obtainable with 5 M diethanolamine (Experiment 3) and to higher amounts of $CO_2$ reabsorbed.

TABLE V

Results of $CO_2$ Reabsorption into Regenerated Solutions

| Expt. No. | Amine | $CO_2$ Reabsorbed Liters | 6th thru 10th Liter Time, Sec. | 16th thru 20th Liter Time, Sec. |
|---|---|---|---|---|
| 1 | 3 M 2-amino-2-methyl-1-propanol | 37.5 | 29 | 48 |
| 2 | 3 M diethanolamine | 25 | 33 | 87 |
| 3 | 5 M diethanolamine | 33 | 31 | 42 |
| 4 | 3 M 2-amino-2-methyl-1-propanol + 2 M 1-diethylamino-2-propanol | 39 | 32 | 41 |
| 5 | 3 M 2-amino-2-methyl-1-propanol 1.5 M 2-dimethylamino ethanol | 42.4 | 32 | 44 |
| 6 | 3 M 2-amino-2-methyl-1-propanol | | | |

TABLE V-continued

| | | Results of $CO_2$ Reabsorption into Regenerated Solutions | | |
|---|---|---|---|---|
| Expt. No. | Amine | $CO_2$ Reabsorbed Liters | 6th thru 10th Liter Time, Sec. | 16th thru 20th Liter Time, Sec. |
| 7 | 1.5 M 3-dimethylamino-1-propanol 2.5 M 2-amino-2-methyl-1-propanol + | 41.4 | 42 | 49 |
| 8 | 2.5 M 1-dimethylamino-2-propanol 2.5 M diethanolamine + | 39.5 | 40 | 50 |
| 9 | 2.5 M 2-diethylamino ethanol 3 M 2-diethylamino ethanol | 36.1 33.8 | 49 100 | 59 120 |

The process of the present invention, in addition to providing the advantages of an improved lower heat of reaction and a higher total amine concentration compared to the use of sterically hindered amines alone, also enjoys the advantage of improved "working capacity" compared to a process operating under substantially the same conditions without the use of a sterically hindered amine as disclosed and claimed in U.S. Ser. No. 590,427, filed June 26, 1975, the disclosure of which is incorporated herein by reference. As in the case of U.S. Ser. No. 590,427, the term "working capacity" relates to the thermodynamic cyclic capacity, that is the loading is measured at equilibrium conditions. This working capacity may be obtained from the relation between the $CO_2$ pressure in the gas and the $CO_2$ loading in the solution at equilibrium at a given temperature. To calculate the thermodynamic cyclic capacity, the following parameters must usually be specified: (1) $CO_2$ absorption pressure, (2) $CO_2$ regeneration pressure, (3) temperature of absorption, (4) temperature of regeneration, (5) solution composition, that is weight percent amine, and (6) gas composition.

The improved working capacity which results by the use of the sterically hindered amine and the tertiary amino alcohol can be determined by direct comparison with a process wherein a sterically hindered amine is not included in the aqueous scrubbing solution. For example, it will be found when comparing two aqueous amine $CO_2$ scrubbing processes (that is similar gas composition, similar scrubbing solution, similar pressure and temperature conditions) that when the sterically hindered amines and tertiary amino alcohols are utilized the difference between the amount of $CO_2$ absorbed at the end of the absorption step (at equilibrium) and desorption (at equilibrium) is significantly greater, generally at least 15% greater, and often 20 to 60% greater than the working capacity of an aqueous amine scrubbing solution which does include a sterically hindered amine and a tertiary amino alcohol, i.e., an aqueous solution containing diethanolamine.

Accordingly, in another preferred embodiment of the present invention, a carbon dioxide containing acidic gas is removed from a normally gaseous stream by means of a process which comprises, in sequential steps (1) contacting the normally gaseous feed stream with a solution comprising an amine at conditions whereby said carbon dioxide containing gas is absorbed in said solution, and (2) regenerating said solution at conditions whereby said acid gas is desorbed from said solution, the improvement which comprises operating said process at conditions whereby the working capacity is greater than obtained under substantially the same conditions of absorption and desorption except that said solution does not include a sterically hindered amine and a tertiary amino alcohol, wherein said working capacity is defined as the difference in moles between $CO_2$ loading in the solution at absorption conditions (step 1) and the $CO_2$ loading in solution at regeneration conditions (step 2) when measured at equilibrium conditions.

While the invention has been described in connection with specific embodiments thereof, it will be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the removal of carbon dioxide containing acidic gases from a normally gaseous mixture, which comprises:
    (a) contacting said normally gaseous mixture with an aqueous amine solution comprising at least about 50 mol % of a sterically hindered amino alcohol and at least about 10 mol % of a tertiary amino alcohol, wherein said sterically hindered amino alcohol contains at least one secondary amino group which is part of a ring and is attached to either a secondary or tertiary carbon atom or a primary amino group attached to a tertiary carbon atom; and
    (b) desorbing at least a portion of the absorbed carbon dioxide containing acidic gases from said solution.

2. The process of claim 1 wherein said tertiary amino alcohol is a member selected from the group consisting of N-methyl diethanolamine, N-ethyl diethanolamine, 2-dimethylamino ethanol, 2-dimethylamino-1-propanol, 3-dimethylamino-1-propanol, 1-dimethylamino-2-propanol, N-methyl-N-ethyl ethanolamine, 2-diethylamino ethanol, 3-dimethylamino-1-butanol, 3-dimethylamino-2-butanol, N-methyl-N-isopropyl-ethanolamine, N-methyl-N-ethyl-3-amino-1-propanol, 4-dimethylamino-1-butanol, 4-dimethylamino-2-butanol, 3-dimethylamino-2-methyl-1-propanol, 1-dimethylamino-2-methyl-2-propanol, 2-dimethylamino-1-butanol and 2-dimethylamino-2-methyl-1-propanol.

3. The process of claim 1 wherein the tertiary amino alcohol is a member selected from the group consisting of N-methyl diethanolamine, 2-dimethylamino ethanol, 3-dimethylamino-1-propanol and 1-diethylamino-2-propanol.

4. The process of claim 1 wherein said sterically hindered amine is a member selected from the group consisting of 2-amino-2-methyl-1-propanol, 2-amino-2-methyl-1-butanol, 3-amino-3-methyl-1-butanol and 3-amino-3-methyl-2-pentanol.

5. The process of claim 1 wherein the total amine concentration in the solution is in the range from about 1 to about 6 molar, the content of the sterically hindered amino alcohol is at least 65 mol % of the total amine and the content of the tertiary amino alcohol is in the range from about 20 to about 35 mol % of the total amine.

6. The process of claim 5 wherein the sterically hindered amino alcohol is 2-amino-2-methyl-1-propanol.

7. The process of claim 1 wherein the absorption in step (a) is conducted at a temperature ranging from about 20° to about 100° C and at a pressure ranging from about 5 to about 2000 psig, and the desorption in step (b) is conducted at a temperature ranging from about 50° to about 170° C and at a pressure ranging from about 1 to about 50 psia.

8. The process of claim 7 wherein the absorption in step (a) is conducted at a temperature ranging from about 40° to about 60° C and at a pressure ranging from about 100 to about 1500 psig, and the desorption in step (b) is conducted at a temperature ranging from about 80° to about 150° C and at a pressure ranging from about 15 to about 30 psia.

9. The process of claim 1 wherein the total amine concentration in said solution is in the range from about 3 to about 5 molar.

10. The process of claim 1 wherein the amine solution additionally includes additives selected from the group consisting of antifoaming agents, antioxidants and corrosion inhibitors.

11. A process for the removal of carbon dioxide containing acidic gases from a normally gaseous mixture, which comprises:
  (a) contacting said normally gaseous mixture with an aqueous amine solution comprising at least about 50 mol % of 2-amino-2-methyl-1-propanol and at least about 10 mol % of a tertiary amino alcohol selected from the group consisting of N-methyl diethanolamine, 2-dimethylamino ethanol, 3-dimethylamino-1-propanol and 1-dimethylamino-2-propanol; and
  (b) desorbing at least a portion of the absorbed carbon dioxide containing acidic gases from said solution.

12. The process of claim 11 wherein the total amine concentration in the solution is in the range from about 1 to about 6 molar, the content of 2-amino-2-methyl-1-propanol is at least 65 mol % of the total amine and the content of the tertiary amino alcohol is in the range from about 20 to about 35 mol % of the total amine.

13. The process of claim 11 wherein the absorption in step (a) is conducted at a temperature ranging from about 20° to about 100° C. and at a pressure ranging from about 5 to about 2000 psig, and the desorption in step (b) is conducted at a temperature ranging from about 50° to about 170° C. and at a pressure ranging from about 1 to about 50 psia.

14. The process of claim 13 wherein the absorption in step (a) is conducted at a temperature ranging from about 40° to about 60° C. and at a pressure ranging from about 100 to about 1500 psig, and the desorption in step (b) is conducted at a temperature ranging from about 80° to about 150° C. and at a pressure ranging from about 15 to about 30 psia.

15. The process of claim 11 wherein the total amine concentration in said solution is in the range from about 3 to about 5 molar.

16. The process of claim 11 wherein the amine solution additionally includes additives selected from the group consisting of antifoaming agents, antioxidants, and corrosion inhibitors.

* * * * *